US008180291B2

(12) United States Patent
Burr

(10) Patent No.: US 8,180,291 B2
(45) Date of Patent: May 15, 2012

(54) POWER-SCAVENGING RECEIVER TO GENERATE A SIGNAL TO BE USED TO CONTROL OPERATIONAL STATE

(75) Inventor: Jeremy Burr, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1117 days.

(21) Appl. No.: 10/956,995

(22) Filed: Sep. 30, 2004

(65) Prior Publication Data
US 2006/0068750 A1 Mar. 30, 2006

(51) Int. Cl.
H04B 7/00 (2006.01)
H04B 1/16 (2006.01)

(52) U.S. Cl. .................... 455/41.2; 455/343.2

(58) Field of Classification Search ............... 455/41.2, 455/574, 343.1, 343.2, 343.3; 340/10.1, 340/10.33, 10.34, 10.42, 7.32, 7.33
See application file for complete search history.

(56) References Cited

U.S. PATENT DOCUMENTS

| | | | |
|---|---|---|---|
| 6,525,648 B1 | 2/2003 | Kubler et al. | |
| 6,892,052 B2 * | 5/2005 | Kotola et al. | 455/41.2 |
| 6,963,289 B2 * | 11/2005 | Aljadeff et al. | 340/825.49 |
| 7,103,344 B2 * | 9/2006 | Menard | 455/343.2 |
| 7,466,678 B2 * | 12/2008 | Cromer et al. | 370/331 |
| 2002/0098861 A1 | 7/2002 | Doney et al. | |
| 2004/0203352 A1 * | 10/2004 | Hall et al. | 455/41.1 |
| 2005/0020321 A1 * | 1/2005 | Rotzoll | 455/572 |
| 2005/0030160 A1 * | 2/2005 | Goren et al. | 340/10.5 |
| 2005/0095573 A1 * | 5/2005 | Overhultz et al. | 434/365 |
| 2005/0261037 A1 * | 11/2005 | Raghunath et al. | 455/574 |
| 2006/0022802 A1 * | 2/2006 | Bridgelall | 340/10.33 |
| 2006/0030353 A1 * | 2/2006 | Jun | 455/550.1 |

FOREIGN PATENT DOCUMENTS

WO   WO 03/065289 A1   8/2003
WO   WO 03/098851 A1   11/2003

OTHER PUBLICATIONS

Hall, Eric S. et al., "RF Rendez-Blue: Reducing Power and Inquiry Costs in Bluetooth-Enabled Mobile Systems," Computer Communications and Networks, 2002.
Proceedings, Eleventh International Conference on Oct. 14-16, 2002, Piscatawy, NJ, USA, IEEE, pp. 640-645.
PCT Search Report and Written Opinion for Int'l Patent Application No. PCT/US2005/031476 mailed Dec. 16, 2005, 14 pgs.
Int'l Preliminary Report for Int'l Patent Application No. PCT/US2005/031476 mailed Apr. 12, 2007, 9 pgs.
Search Report and Substantive Examination Adverse Report for Malaysian Patent Application No. PI 20053381 mailed Sep. 23, 2008, 6 pgs.

* cited by examiner

Primary Examiner — Nguyen Vo
(74) Attorney, Agent, or Firm — Blakely, Sokoloff, Taylor & Zafman LLP

(57) ABSTRACT

Methods and apparatuses for selectively powering an electronic device based on signals from a power-scavenging receiver circuit.

13 Claims, 8 Drawing Sheets

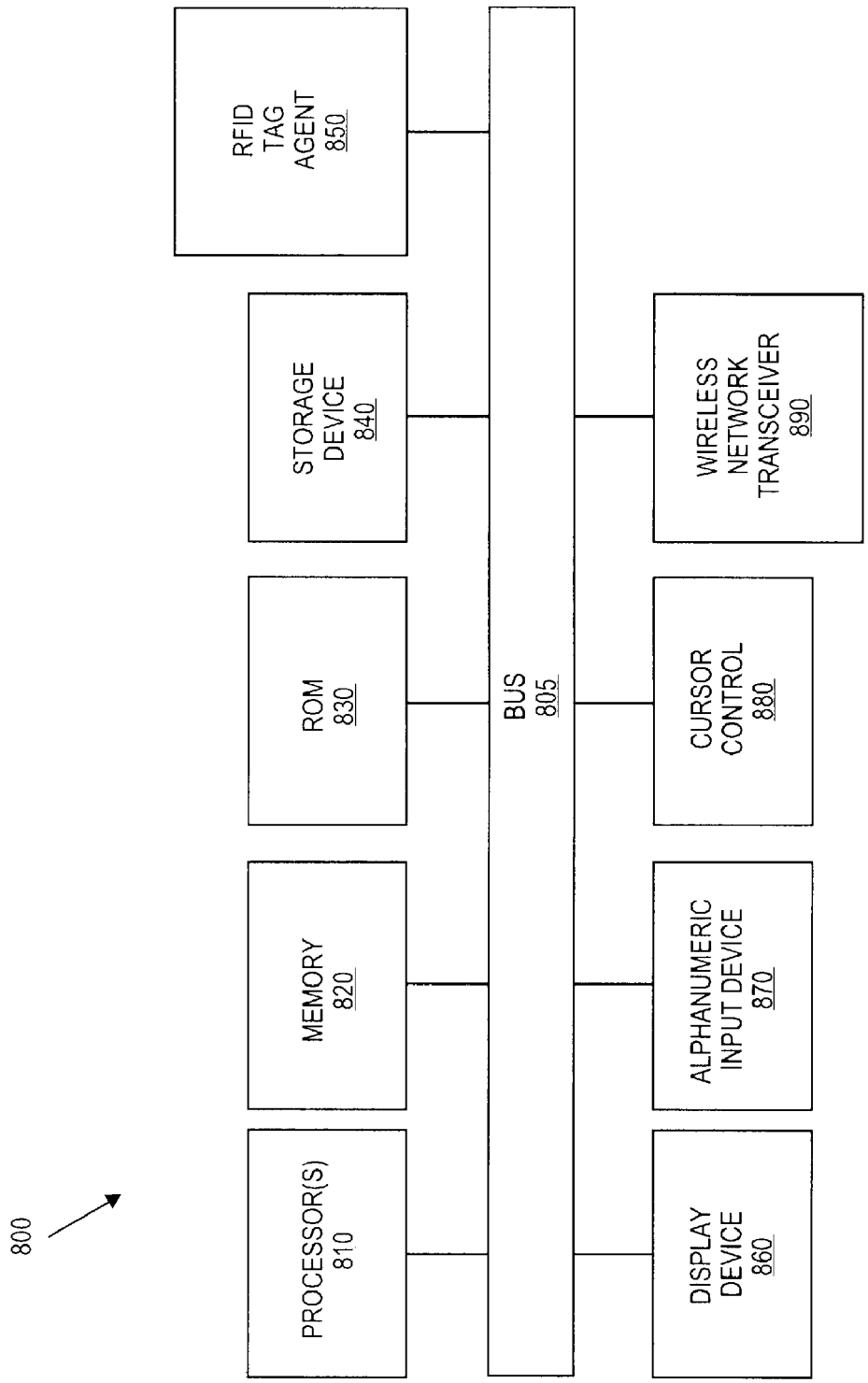

US 8,180,291 B2

POWER-SCAVENGING RECEIVER TO GENERATE A SIGNAL TO BE USED TO CONTROL OPERATIONAL STATE

TECHNICAL FIELD

Embodiments of the invention relate to use of a power-scavenging receiver (e.g., RFID) to generate a signal to be used to control operational state. More particularly, embodiments of the invention relate to use of the power-scavenging receiver to cause changes in operational state of a wired or wireless communications or computing device.

BACKGROUND

When electronic devices operate using wireless communications protocols, it is common for the power consumption required for transmitting and receiving wireless signals to be a significant portion of the overall power consumption of the electronic device. Various techniques have been used in an attempt to reduce power consumption. These techniques include leaving the receiver continuously on, receiving all data, waiting for any packets that are destined for the specific electronic system. However, this is very wasteful of battery power.

Another technique that may consume less power is to place the receiver in a sleep/parked mode and to use watchdog timers to schedule synchronized wake up events to acknowledge and resynchronize with the network. During resynchronization, status information about messages can be communicated, and the transceiver system can determine whether to receive the messages or resume the sleep/parked mode. However, placing a device is a sleep/parked mode may increase latencies and decrease overall system performance.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 8 is a block diagram of one embodiment of an electronic system.

DETAILED DESCRIPTION

Figure 1:
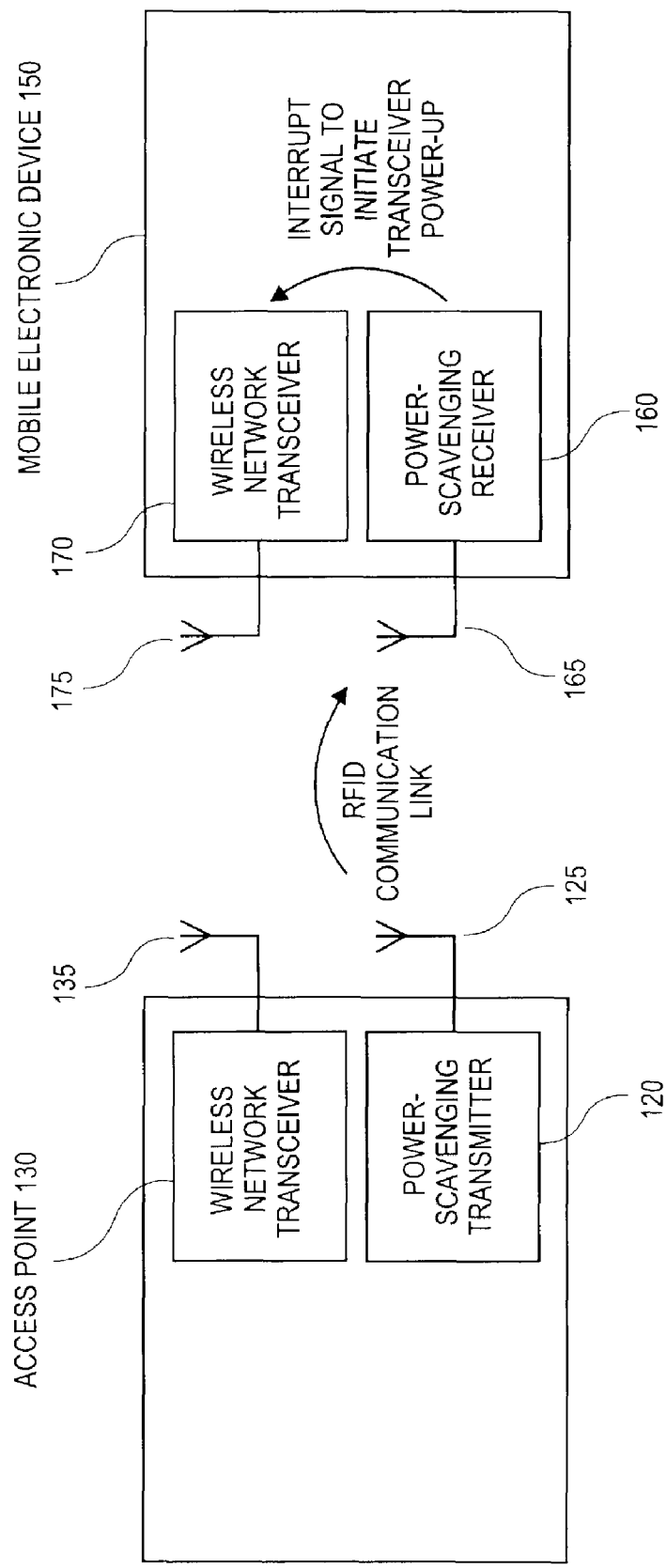
FIG. 1 is a block diagram of one embodiment of a mobile device a power-scavenging receiver that may activate a wireless transceiver.

In the following description, numerous specific details are set forth. However, embodiments of the invention may be practiced without these specific details. In other instances, well-known circuits, structures and techniques have not been shown in detail in order not to obscure the understanding of this description.

Described herein are methods and apparatuses that allow a transceiver to power down, preventing the reception of inappropriate messages and removing the need for speculatively powering back up, while dynamically powering the wireless transceiver back up when the circumstances justify active listening to the network. The example that follows describes certain protocols and conditions for purposes of illustration only. The techniques described herein are more broadly applicable.

IEEE 802.11 protocols described herein may include, for example, IEEE 802.11b and/or IEEE 802.11g. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents.

As an example, a user may leave their workplace with an IEEE 802.11 enabled laptop or personal digital assistant (PDA). While in the building, the IEEE 802.11 transceiver may remain connected to the wireless network. When leaving the building using current devices, the IEEE 802.11 transceiver typically continues to hunt for the network, and eventually powers itself down (or runs out of battery power still hunting for the network) or continues sporadically hunting for the network. If the IEEE 802.11 transceiver locates a suitable IEEE 802.11 network the receiver may receive incoming data, which may be dropped because none of the data is destined for the device. These three cases describe power consumption that provided no net value for the user.

The techniques described herein may allow a wireless (e.g., IEEE 802.11) transceiver to be completely powered down until a suitable environment is detected. In one embodiment, there may be multiple environments where radio frequency (RF) energy impinges on the transceiver, but until a suitable environment is detected the transceiver may remain off. In one embodiment, radio frequency identification (RFID) technologies, or other power scavenging RF receivers, may be used as an alternate method of communications to the transceiver to indicate that a suitable wireless communication environment is available without any power consumption by the IEEE 802.11 transceiver.

The nature of RFID communications is such that the impinging RF energy within the RF signal provides sufficient power for the RFID receiver to operate, without any power drain from the device's battery (or other power source). Consequently, the RFID receiver may be operational only when the receiver falls within range of an RFID transmitter, which may be used to indicate the presence of, for example, an IEEE 802.11 wireless network.

In one embodiment, the RFID and wireless network components of a mobile device may be integrated into a single (client) device. In one embodiment, the components outside the mobile device, for example, the RFID reader and a wireless network transceiver may be integrated into a single device, or may be implemented separately. For example, a RFID network may be superimposed over an IEEE 802.11 network infrastructure by placing the RFID reader within an IEEE 802.11 access point, or placing the RFID reader near the access point. As another example, the IEEE 802.11 access points may be placed within the infrastructure of a building, while the RFID readers may be placed within the entry portals.

Thus, while the user in the above example passes through the entry portal, the RFID signal may communicate with the mobile electronic devices that the IEEE 802.11 wireless network is available within the environment, and that the device should turn on the IEEE 802.11 transceivers and begin the discovery protocols for identifying the network access points. In one embodiment, the RFID receiver circuit may generate an interrupt to the wireless transceiver that may cause the wireless receiver to power up the transceiver from the powered-down state and initiate contact with the wireless network.

In the description of various embodiments of the invention provided herein, the phrase "power-scavenging protocol" is intended to generically refer to any wireless protocol where a receiver may derive enough power from a received wireless signal to perform a designated function. Examples of power-scavenging protocols are the above referenced RFID protocols; however, other power-scavenging protocols may also be used. The phrase "wireless network" is intended to generically refer to any wireless communication protocol including, for example, the above referenced IEEE 802.11 protocols, cellular communications protocols or any other type of wireless communication protocol.

Many of the examples provided herein are related to controlling the operational state of a wireless transceiver. However, the techniques and devices described herein are more broadly applicable. For example, power-scavenging receivers may be used in conjunction with wired or wireless devices as well as disconnected computing devices. Any device that communicates with other devices via wired or wireless media may be referred to as connected devices. Disconnected computing devices are devices that have any level of computational power (e.g., a processor, a state machine) and may be disconnected from any other electronic device. An example of a disconnected device is a temperature transducer described in an example below.

FIG. 1 is a block diagram of one embodiment of a mobile device a power-scavenging receiver that may activate a wireless transceiver. In one embodiment, power-scavenging protocol transmitter 120 and wireless network access point 130 are separate devices. In alternate embodiments, power-scavenging protocol transmitter 120 and wireless network access point 130 may alternatively be components of a single electronic system, for example, an integrated wireless network access point.

Mobile electronic device 150 may be any type of mobile electronic device including, for example, a laptop computer, a personal digital assistant (PDA), a cellular telephone, etc. Mobile electronic device 150 may include additional components not included in FIG. 1, for example, a digital signal processor, a disk drive, input/output (I/O) devices. In one embodiment, mobile electronic device 150 may include at least power-scavenging protocol receiver 160 (referred to hereafter as "RFID receiver" for conciseness) and antenna 165 and wireless network transceiver 170 and antenna 175. As will be described in greater detail below, additional and/or different components (e.g., a processor, memory, a peripheral device) may be coupled to RFID receiver 160.

RFID receiver 160 may operate in any manner known in the art for power-scavenging receivers to receive radiation from a transmitting device, for example, power-scavenging protocol transmitter 120 (referred to hereafter as "RFID reader" for conciseness) via antenna 125. RFID reader 120 may have a relatively short transmission range (e.g., 1 m to 10 m) in which enough power may be radiated to allow RFID receiver to operate using power scavenged from the received signal.

In one embodiment, one or more RFID readers and antennae (e.g., 120, 125) may be located so as to correspond with an approximate range of wireless network access point 130, which may be a transmission range that is significantly grater (e.g., 100 m or more) than RFID reader 125. Thus, the one or more RFID readers and corresponding antennae may indicate to RFID receiver 160 of mobile electronic device 150 that mobile electronic device 150 may be within range of wireless network access point 130.

In one embodiment, in response to receiving a signal from RFID reader 120, RFID receiver 160 may generate an interrupt signal. The interrupt signal generated by RFID receiver 160 may be interpreted by wireless network transceiver 170 or another component of mobile electronic device 150 (not shown in FIG. 1) to indicate that mobile electronic device 150 may be within range of wireless network access point 130. The interrupt signal may be used, for example, to initiate a power up sequence or an authentication sequence.

Thus, wireless network transceiver 170 may be powered down unless within range of wireless network access point 130. In addition to powering up wireless network transceiver 170, RFID receiver 160 and RFID reader 120 may operate to cause wireless network transceiver 170 to be powered down when beyond the range of wireless network access point 130. In the example of FIG. 1 RFID receiver 160 is illustrated as coupled to a single wireless network receiver for reasons of simplicity of illustration only. RFID receiver 160 may be coupled to provide signals to any number of wireless network transceivers and/or other components of mobile electronic device 150.

For example, wireless network transceiver 170 may be engaged in a wireless communication session with wireless network access point 130 when RFID receiver 160 receives a signal from RFID reader 120. Because the signal received from RFID reader 120 may indicate the approximate limits of the range of wireless network access point 130, RFID receiver may generate a signal that is used to cause wireless network transceiver 170 to power down. Thus, a wireless transceiver in a mobile electronic device may be completely powered down when the mobile electronic device is not within range of an appropriate wireless network access point. While the current example is related to powering down of a wireless network transceiver, wired components may be selectively powered up and powered down using signals received by an RFID receiver or other power-scavenging receiver.

In the embodiment described above, RFID reader 120 and RFID receiver 160 may operate to indicate to wireless network transceiver 170 the approximate boundaries of a wireless network. In another embodiment, RFID reader 120 and RFID receiver 160 may be enabled for bi-directional communications to allow mobile electronic device 170 to be authenticated before attempting to engage in communications with wireless network access point 130. That is, RFID receiver 160 and RFID reader 120 may communicate data that may indicate a unique device or user, thus the RFID communications may used to authorize the communications for wireless transceiver 170 before the wireless transceiver 170 is powered up.

For example, an employee and a guest may enter a corporate lobby each having laptops and/or PDAs. The laptops and/or PDAs owned by the employee and guest both initiate communication with the corporate wireless network in response to indications from RFID receivers as discussed above. Both party's devices may be capable of communicating with the corporate network using, for example, IEEE 802.11 protocols, but only the employee's laptop and PDA are authorized to initiate such communications. Consequently, the employee's devices power up their wireless network transceivers and commence discovery activities and communication with the corporate network (e.g., receive e-mail and calendaring updates), while the guest's wireless network transceivers may remain powered down because they are not authorized to initiate communications. This may allow the guest device to preserve battery power.

The RFID receiver (or RFID receiver/transmitter combination) may be connected to an antenna structure to receive RF energy from the RFID reader and possibly to transmit to the RFID reader. The RFID receiver may be attached to an antenna structure that may operate in a designated RF frequency band or may operate in multiple RF frequency bands. The RFIF receiver may operate in the same or different frequency band(s) as the wireless transceiver to which the RFID receiver is connected. For example, the RFID receiver may operate in the 900 MHz spectrum, while the wireless network transceiver may operate in the 2.4 GHz spectrum. In one embodiment, the RFID receiver and the wireless network transceiver may utilize shared electronic circuitry (e.g., a multi-protocol radio) even if operating in different frequency bands.

In one embodiment, a wireless network protocol may be extended to include RFID technologies and methods, such that both communications may operate at the same time. For example, an IEEE 802.11 compliant radio design may be extended to allow RFID modulation schemes to be included in the transmitted and received signals. This may allow the IEEE 802.11 compliant radio to be powered off until authorized over the RFID link to communicate, at which time the IEEE 802.11 compliant radio may power back up and begin communications over the IEEE 802.11 compliant link.

The techniques described herein may be applicable to all forms of radiant energy communication (i.e., the entire electro-magnetic spectrum), and may be suitable for communications utilizing low frequency, radio frequency, microwave, light wave frequency, X-ray frequencies and beyond. For example, the techniques described herein may be utilized to remotely power up a satellite in orbit using electro-magnetic energy if sufficient energy could be directed towards the satellite and similar communication methods to RFID methods were employed.

In one embodiment, once wireless network transceiver 170 (or other secondary electronic circuitry) has powered up, power may be provided from the primary power supply to RFID receiver 160 rather than from the incident energy. For example, this may be desirable to improve signal to noise ratio, latency, or robustness to variations in channel properties that affect the incident energy (e.g., dropouts in signal strength due to frequency hopping between channels).

The RFID receiver/transceiver may be implemented using discrete components or embedded into a single circuit. In both of these implementations, external connections may be provided from the RFID receiver/transceiver to the associated antenna structure and to the electronic circuitry to which the RFID receiver/transceiver is configured to communicate. Alternately, the RFID receiver/transceiver may be integrated into the electronic circuitry (e.g., the wireless network transceiver) on the same silicon die (see FIG. 5, below). This may eliminate device packaging and assembly cost imposed by implementing the RFID transceiver as an external component.

Figure 2:
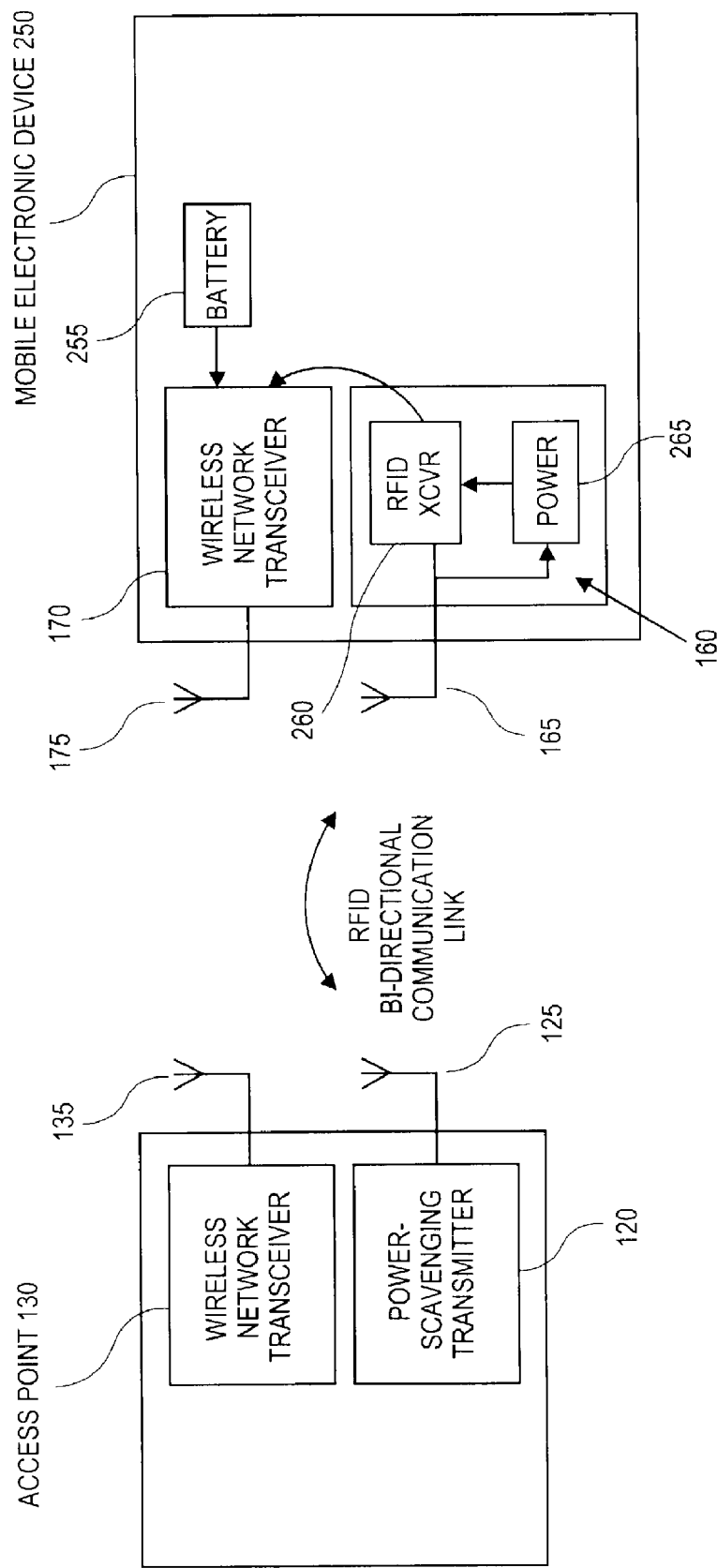
FIG. 2 is a block diagram of one embodiment of a mobile device a power-scavenging receiver that may activate a wireless transceiver having separate power sources.

FIG. 2 is a block diagram of one embodiment of a mobile device a power-scavenging receiver that may activate a wireless transceiver having separate power sources. Mobile electronic device 250 operates in a similar manner as mobile electronic device 150 of FIG. 1. Mobile electronic device 250 is illustrated with battery 255 to supply power to wireless network transceiver 170 and power-scavenging source 265 to supply power to RFID transceiver 260. Power-scavenging source 265 and RFID transceiver 260 may operate in any manner known in the art to scavenge power from radiated energy to allow RFID transceiver 260 to generate a signal, for example, an interrupt signal.

Figure 3:
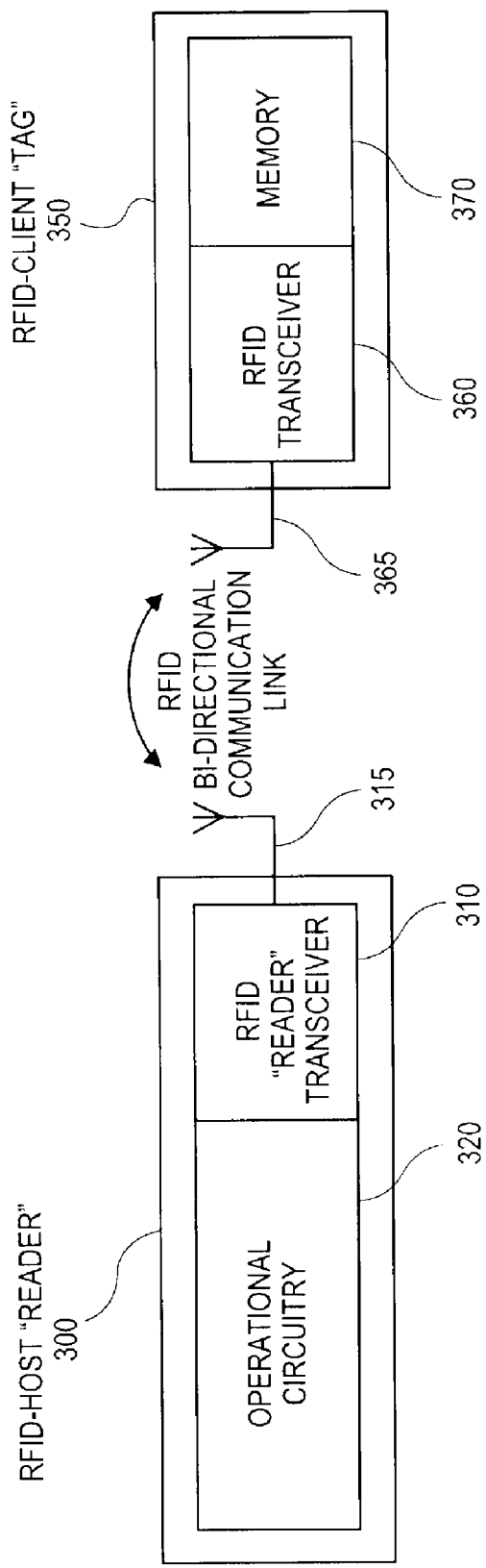
FIG. 3 is a block diagram of a prior art RFID reader and RFID tag.

FIG. 3 is a block diagram of a prior art RFID reader and RFID tag. Currently RFID are based on an asymmetric level of complexity (i.e., the RFID readers are much more complex than the RFID tags), to simplify the tag design to reduce tag cost. Many current RFID readers merely detect the RFID tag. Some RFID readers, such as those conforming to ISO18000-x specifications can also read and write data into the RFID tags. Using the devices and techniques described herein the RFID tag may initiate activity within the RFID tag host system instead of the within the RFID reader host system. That is, prior art technologies initiate activity and perform functions in the RFID reader host system, based upon RFID tag presence and information contained within RFID tag. In contrast, the devices and techniques described herein may initiate activity and/or perform functions in RFID tag host system, based upon proximity with the RFID reader.

Referring to FIG. 3, RFID reader 300 may include RFID transceiver 310 that is coupled with antenna 315 and operational circuitry (processor, memory, etc.) 320. During operation, RFID transceiver 310 transmits a signal via antenna 315. When RFID transceiver 360 of RFID tag 350 receives the signal via antenna 365, RFID transceiver 360 may retrieve a value from memory 370, which may be, for example, a 128-bit read-only memory (ROM) or other non-volatile memory device.

RFID transceiver 360 may transmit the value retrieved from memory 370 to RFID transceiver 310, which may pass the value to operational circuitry 320 of RFID reader 300. Operational circuitry 320 may perform any type of function based on the value received from RFID tag 350. However, note that the action occurs in RFID reader 300, which may remain powered up in order to transmit signals and RFID tag 350 provides minimal functionality.

Figure 4:
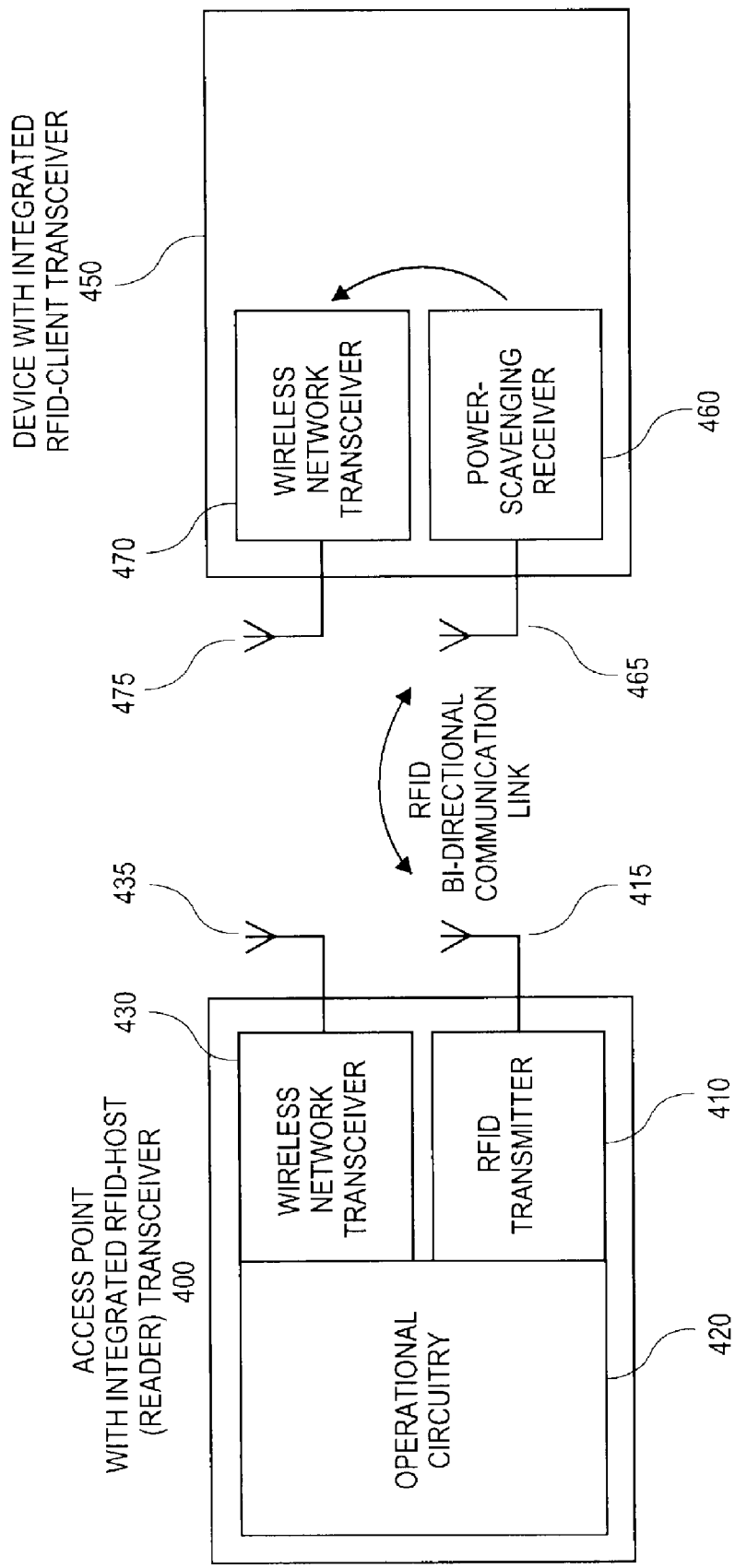
FIG. 4 is a block diagram of one embodiment of an access point having an RFID reader and a mobile electronic device having an RFID tag that interacts with operational circuitry.

FIG. 4 is a block diagram of an access point having an RFID reader and a mobile electronic device having an RFID tag that interacts with operational circuitry. The example of FIG. 4 includes access point 400 that may include both RFID transceiver 410 and associated antenna 415 (which operate as an RFID reader) and wireless network transceiver 430 and associated antenna 435 (which provide network access point functionality). In alternate embodiments, components that provide the RFID reader functionality may be physically separate from components that provide the access point functionality. Wireless network transceiver 430 and/or RFID transceiver 410 may be coupled with operational circuitry 420 that may provide additional functionality (e.g., network routing, formatting, timing).

In one embodiment, RFID transceiver 410 may transmit a signal via antenna 415 when access point 400 is operational. RFID transceiver 410 may be coupled with operational circuitry (e.g., processor, memory) 420 and/or wireless network transceiver 430. Wireless network transceiver 430 and antenna 435 may operate to provide wireless network functionality in any manner known in the art.

RFID transceiver 460 may receive signals transmitted by RFID transceiver 410 when mobile electronic device 450 is within range of access point 400. When RFID transceiver 460 receives a signal from RFID transceiver 410, a signal may be generated that may be transmitted to wireless network transceiver 470 and/or operational circuitry (e.g., processor, memory) 450. The signal generated by RFID transceiver 460 may be included in an initiation and/or authentication process that may allow mobile electronic device to interact with access point 400 via wireless network transceiver 470 and antenna 475.

In one embodiment, an RFID transceiver circuit may generate an interrupt signal to a wireless network transceiver (e.g., IEEE 802.11 radio) for the purpose of bringing the wireless network transceiver out of a powered down (e.g., sleep, hibernate, or other low-power state) state. In alternate embodiments, RFID transceiver 360 may be configured to communicate with many classes of electronic circuitry, which may include, for example, wireless and computing technologies may utilize the signal generated by RFID transceiver 360 for state transition or other purposes. RFID transceiver 360 may further be configured to communicate with other electronic devices, for example, peripheral devices such as keyboards.

RFID transceiver 360 may be configured to engage in more complex forms of communication to electronic circuitry, for example, in addition to the interrupt signal, or in place of the interrupt signal, RFID transceiver 360 may communicate status information to the electronic system, such as wireless frequencies that are authorized for communication, and wireless frequencies that are not authorized. For example, when an employee travels to a foreign country, the additional communication may be local country information that indicates the frequency bands for wireless communications. This data may be communicated via any number of methods including DC and/or AC communications, serial and/or parallel communication, storing such data in memory registers that can be accessed by the electronic circuitry, using electronic, optical and/or wireless communications, etc.

In addition to, or instead of, generating a signal such as an interrupt, RFID transceiver 360 may write a value to a memory location or a register. As additional examples, data bus transactions may be initiated, a dual-port memory may be accessed, etc.

In one embodiment, a signal (e.g., an interrupt signal) may be communicated to a wireless transceiver (e.g., RF, microwave, optical), a processor, a digital signal processing (DSP) device, an analog signal processing device, a custom ASIC, a general purpose field programmable gate array (FPGA) or programmable logic device (PLD), networking device (such as bridge, hub) or computing peripheral (such as keyboard, mouse, joystick, hard drive, storage device), or other electronic circuits including those that contain integrated or discrete components. The signal may be communicated to any of these classes of components even when the different classes are used in combination within a device, for example, a cellular telephone may include both wireless communications and instruction processing capabilities within a microcontroller, and the interrupt may be applied to the wireless transceiver or to the microcontroller. Wired components or devices may receive the signal that may cause a change of operating state. These components may include, for example, keyboard, mouse, ASIC, etc.

Figure 5:
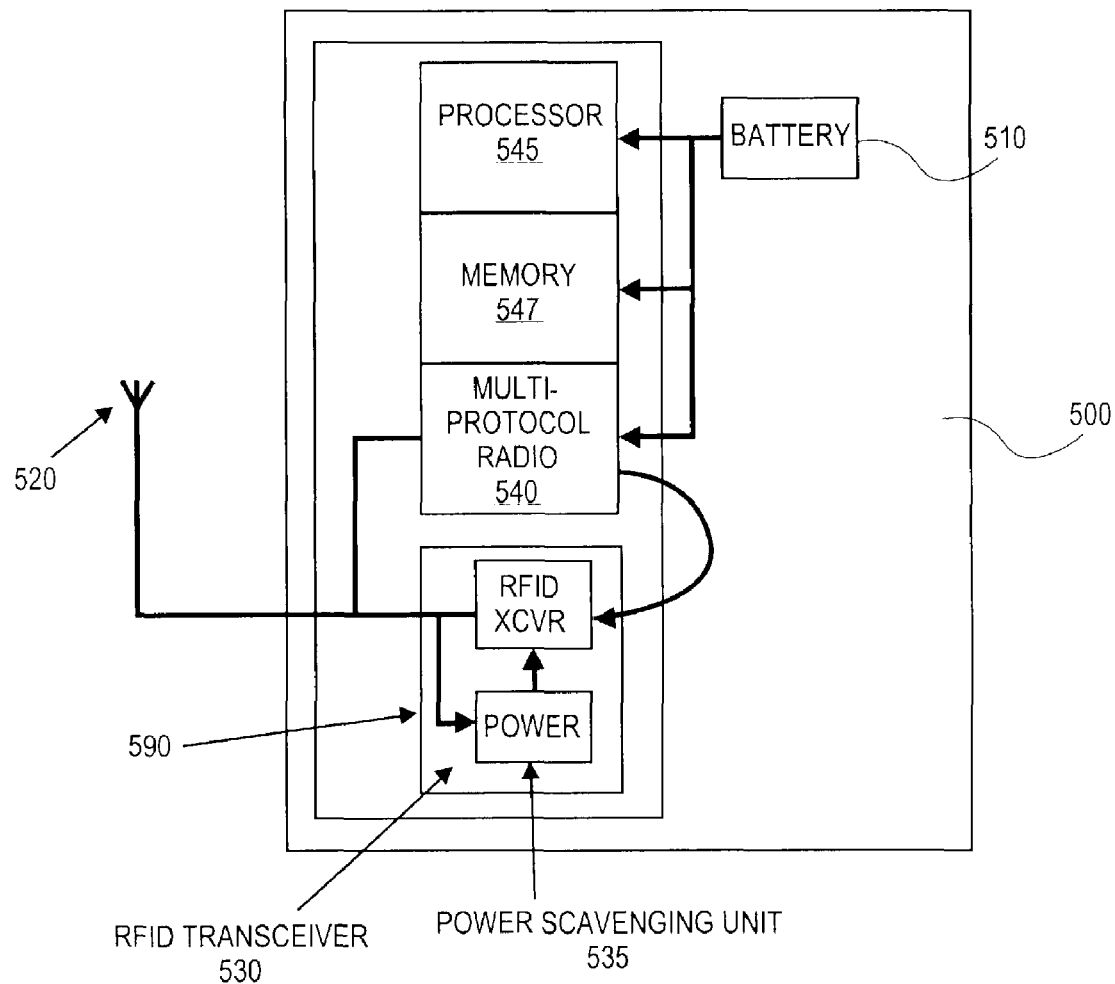
FIG. 5 is a block diagram of one embodiment of an electronic device having an RFID tag that may be selectively powered by a power source used by operational circuitry.

FIG. 5 is a block diagram of one embodiment of an electronic device having an RFID tag that may be selectively powered by a power source used by operational circuitry. The components of FIG. 5 may be discrete components or may be functional components of a single integrated circuit 590. Mobile electronic device 500 may include RFID transceiver 530 that receives signals via antenna 520 and may scavenge power from the received signals using power scavenge power with power scavenging unit 535 using any technique known in the art.

RFID transceiver 530 may share an antenna structure with multi-protocol radio 540 that may support, for example, one or more wireless network protocols and/or an RFID protocol. Mobile electronic device 500 may further include processor 545 and/or memory 547. In one embodiment, battery 510 may provide power to processor 545, memory 547 and/or multi-protocol radio 540. In one embodiment, battery 510 may also provide power to RFID transceiver 530 in response to, for example, the interrupt signal generated by RFID transceiver 530.

As described above, an RFID transceiver circuit may provide an interrupt signal to a wireless network transceiver or other mobile electronic device component for the purpose of bringing the wireless network transceiver out of a powered down state. In alternate embodiments, more complex forms of communication to the electronic circuitry may be supported. For example, in addition to the interrupt signal, or in place of the interrupt signal, the RFID circuit may communicate status information to the electronic system, such as wireless frequencies that are authorized for communication, and wireless frequencies that are not authorized.

In one embodiment, additional instances where portions of, or all of, the electronic circuitry other than the wireless network transceiver may remain powered up when the wireless network transceiver is powered down. For example, while out of range of the wireless network, an employee may add information to a PDA during which time the processor portion of the PDA is powered up, and the RFID circuit is still functional despite the wireless network transceiver being powered down.

Another example is the case where the frequency stability circuits within the wireless network transceiver may remain powered up to retain frequency accuracy or reduce power up time, while the remainder of the wireless network transceiver is powered down. Again, the RFID circuit may still be operational because the RFID circuit may be relying on the incident energy for power.

In one embodiment, using the techniques and structures described herein, power for the entire operational circuitry may be provided by the RFID incident energy. The primary power for the operational circuitry may be supplied by a battery, a main supply, or from other sources. The interrupt signal between the RFID transceiver and the secondary electronics is one example of the communication link between these two system-level components (of transceiver and secondary electronics).

As another example, measurement transducer, for example, a temperature sensor may be a battery-powered circuit that makes measurements using an integrated temperature sensor and stores the data after each measurement in memory. After making each measurement the transducer may power down to conserve battery power. Asynchronously with these measurements, a worker may move around to the various sites where measurement transducers are located and use an RFID reader using RFID technologies to interrogate multiple devices. In one embodiment, the RFID signal received by the RFID transceiver may cause the measurement device to power up by activating an interrupt signal, or by other methods as previously discussed.

The measurement information stored in the memory may be forwarded to the interrogating RFID reader. Alternately, the measurement information stored in memory may be directly accessed by the RFID transceiver and forwarded to the interrogating RFID reader. Thus, the RFID signal received by the RFID transceiver causes change in the operating state of the secondary electronics (in this case the integrated temperature sensor). The transducer may be generalized to any form of sensor, for example, temperature, air pressure, wind speed, fluid flow, numerical counter, elapsed time, any generalized signal-level measurement such as voltage/current/power measurement, whether analogue or digital.

Figure 6:
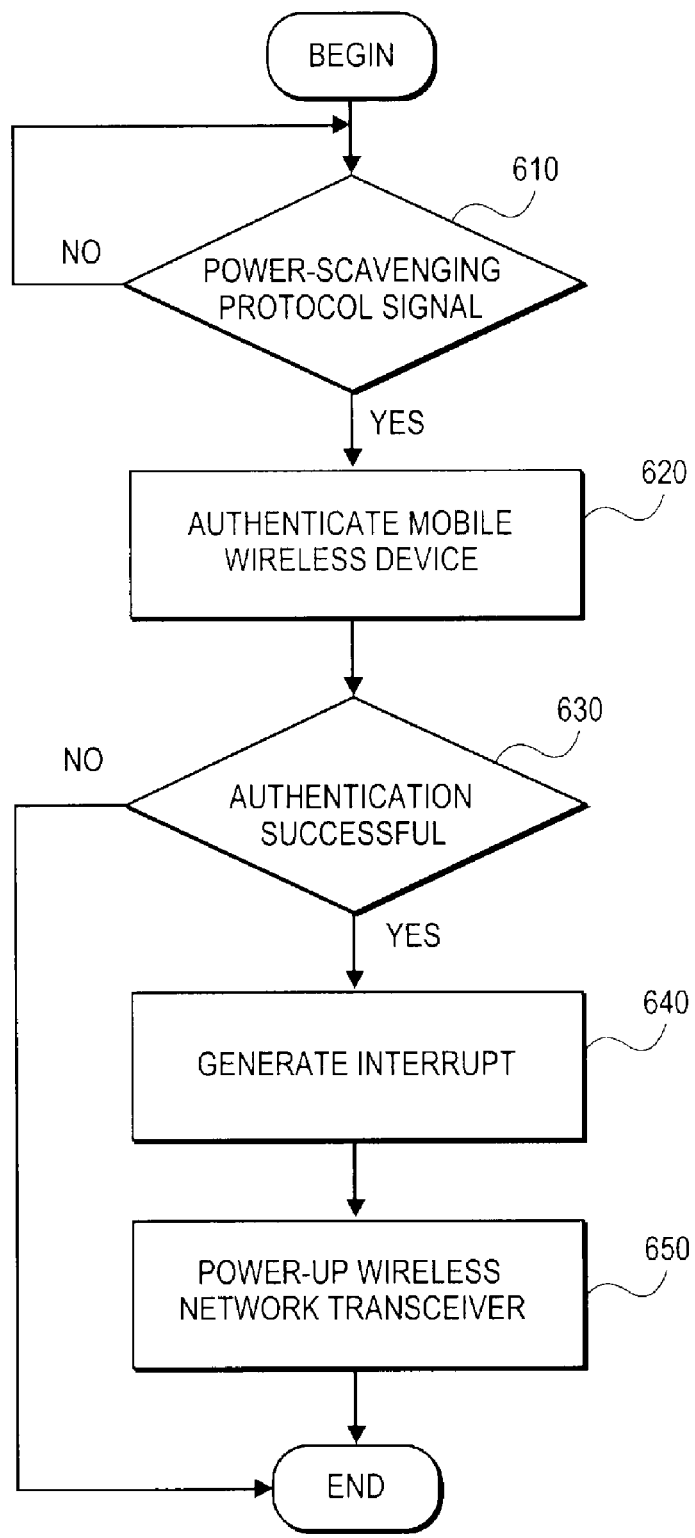
FIG. 6 is a flow diagram of one embodiment of a technique to power up a wireless device in response to signals received via an RFID tag.

FIG. 6 is a flow diagram of one embodiment of a technique to power up a wireless device in response to signals received via an RFID tag. The process of FIG. 6 assumes that a wireless network transceiver has been powered down. The wireless network transceiver may be powered down using the technique of FIG. 7 or using ay other technique.

A power-scavenging transceiver detects a signal having sufficient power to allow a receiving device to perform a pre-selected function, 610. When an appropriate signal has is detected, the power-scavenging protocol may optionally operate to authenticate the mobile electronic device, 620. If authentication is successful, 630, an interrupt (or other signal) may be generated, 640. In response to the interrupt, the wireless network transceiver may be powered up, 650.

Figure 7:
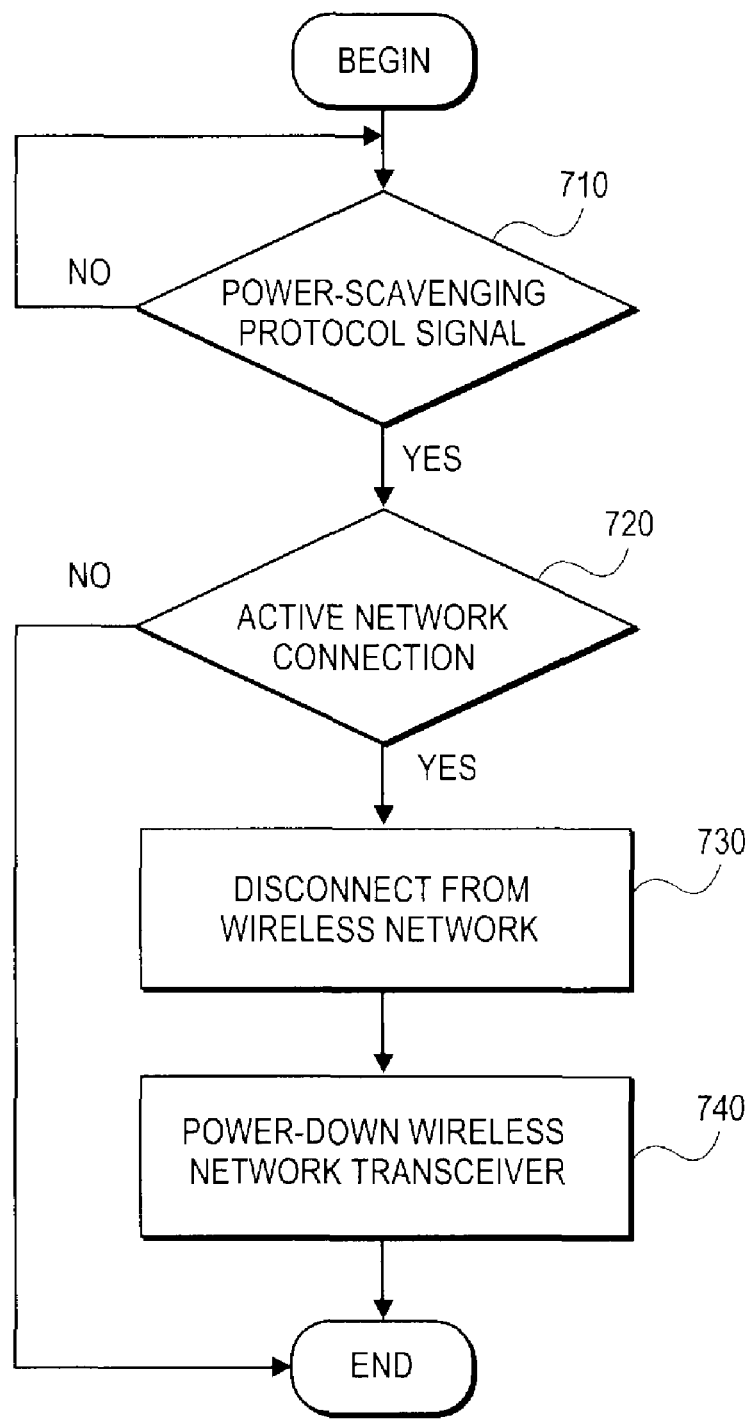
FIG. 7 is a flow diagram of one embodiment of a technique to power down a wireless device in response to signals received via an RFID tag.

FIG. 7 is a flow diagram of one embodiment of a technique to power down a wireless device in response to signals received via an RFID tag. The process of FIG. 7 assumes that a wireless network transceiver is been powered up and may be engaged in a wireless network session.

A power-scavenging transceiver detects a signal having sufficient power to allow a receiving device to perform a pre-selected function, 710 and there is an active network connection, 720, an interrupt (or other signal) may be generated to cause the mobile wireless device to be disconnected from the network, 730. When the wireless device is disconnected from the network, the wireless network transceiver may be powered down, 740.

FIG. 8 is a block diagram of one embodiment of an electronic system. The electronic system illustrated in FIG. 8 is intended to represent a range of electronic systems. Alternative electronic systems can include more, fewer and/or different components. The electronic system may be configured to perform the operations of FIG. 6 and/or FIG. 7.

Electronic system 800 includes bus 805 or other communication device to communicate information, and processor 810 coupled to bus 805 to process information. While electronic system 800 is illustrated with a single processor, electronic system 800 can include multiple processors and/or co-processors. Electronic system 800 further includes random access memory (RAM) or other dynamic storage device 820 (referred to as memory), coupled to bus 805 to store information and instructions to be executed by processor 810. Main memory 820 also can be used to store temporary variables or other intermediate information during execution of instructions by processor 810.

Electronic system 800 also includes read only memory (ROM) and/or other static storage device 830 coupled to bus 805 to store static information and instructions for processor 810. Data storage device 840 is coupled to bus 805 to store information and instructions. Data storage device 840 such as a magnetic disk or optical disc and corresponding drive can be coupled to electronic system 800.

Electronic system 800 can also be coupled via bus 805 to display device 860, such as a cathode ray tube (CRT) or liquid crystal display (LCD), to display information to a user. Alphanumeric input device 870, including alphanumeric and other keys, is typically coupled to bus 805 to communicate information and command selections to processor 810. Another type of user input device is cursor control 880, such as a mouse, a trackball, or cursor direction keys to communicate direction information and command selections to processor 810 and to control cursor movement on display 860. Electronic system 800 may further include a network interface, which may be implemented as wireless network transceiver 890 to provide access to a network, such as a local area network.

In one embodiment, electronic system 800 may include RFID tag agent 850, which may provide the functionality of an RFID tag, or RFID receiver as described above. RFID tag agent 850 may be implemented as a software component, a hardware element, firmware or any combination thereof.

Instructions are provided to memory from a storage device, such as magnetic disk, a read-only memory (ROM) integrated circuit, CD-ROM, DVD, via a remote connection (e.g., over a network via wireless network transceiver) that is either wired or wireless, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
  wireless transceiver circuitry to provide IEEE 802-compliant wireless communication for an electronic device; and
  a power-scavenging receiver coupled with the wireless transceiver circuitry to invoke a pre-selected signal to cause the wireless transceiver circuitry to change operational state in response to a signal received by the power-scavenging receiver, wherein the power-scavenging receiver causes the wireless transceiver circuitry to transition to a low-power state when exiting an environment in which selected wireless communications are enabled as detected by the power-scavenging receiver and causes the wireless transceiver circuitry to transition out of a low-power state and begin a discovery protocol for identifying network access points when entering the environment as detected by the power-scavenging receiver, the power-scavenging receiver receives an indication of wireless frequencies that are authorized for communication, and wireless frequencies that are not authorized, further wherein the signal from the power-scavenging receiver does not cause a change in operational state for components of the apparatus other than the wireless transceiver, the environment defined by a plurality of readers to communicate with the power-scavenging receiver.

2. The apparatus of claim 1 wherein the power-scavenging receiver comprises a radio frequency identification (RFID) receiver.

3. The apparatus of claim 1 further comprising:
a memory coupled with the power-scavenging receiver; and
a power-scavenging transmitter coupled with the memory to transmit a value received from the memory in response to the signal received by the power-scavenging receiver.

4. The apparatus of claim 1 further comprising:
a first antenna coupled with the wireless transceiver circuitry; and
a second antenna coupled with the power-scavenging receiver.

5. The apparatus of claim 1 further comprising an antenna structure coupled with the wireless transceiver circuitry and with the power-scavenging receiver.

6. A system comprising:
one or more IEEE 802-compliant wireless network transceivers to operate in an environment having a coverage boundary according to a wireless network protocol; and
one or more transmitters operating according to a power-scavenging communication protocol positioned to indicate an approximate boundary of a wireless network conforming to the wireless network protocol
a mobile electronic device having a power-scavenging receiver and a wireless network transceiver to operate according to the wireless network protocol, wherein the one or more power-scavenging receivers cause the one or more wireless network transceivers to transition to a low-power state when exiting the environment as detected by the one or more power-scavenging receivers and cause the one or more wireless network transceivers to transition out of the low-power state and begin a discovery protocol for identifying network access points when entering the environment as detected by the one or more power-scavenging receivers, the power-scavenging receiver receives an indication of wireless frequencies that are authorized for communication, and wireless frequencies that are not authorized, further wherein the signal from the power-scavenging receiver does not cause a change in operational state for components of the mobile electronic device other than the wireless network transceiver, the environment defined by a plurality of readers to communicate with the power-scavenging receiver.

7. The system of claim 6 further comprising:
a transmitter in the mobile electronic device to operate according to the power-scavenging communication protocol to transmit identification information corresponding to the mobile electronic device;
one or more power-scavenging receivers coupled with the one or more transmitters to communicate with the transmitter in the mobile electronic device according to the power-scavenging protocol to receive the identification information; and
an authentication agent coupled to communicate with the one or more power-scavenging receivers to authenticate the mobile electronic device based, at least in part, on the identification information.

8. The system of claim 7 wherein the authentication agent comprises an authentication circuit.

9. The system of claim 7 wherein the authentication agent comprises authentication firmware.

10. The system of claim 7 wherein the authentication agent comprises authentication software.

11. An apparatus comprising:
one or more substantially omni-directional antennae;
IEEE 802-compliant wireless communication circuitry coupled with at least one of the one or more substantially omni-directional antennae to operate according to a wireless communication protocol in an environment having a coverage boundary; and
a power-scavenging receiver coupled with the wireless transceiver circuitry to invoke a pre-selected signal to cause the wireless transceiver circuitry to change operational state in response to a signal received by the power-scavenging receiver, wherein the power-scavenging receiver causes the wireless transceiver circuitry to transition to a low-power state when exiting an environment in which selected wireless communications are enabled as detected by the power-scavenging receiver and causes the wireless transceiver circuitry to transition out of a low-power state and begin a discovery protocol for identifying network access points when entering the environment as detected by the power-scavenging receiver, the power-scavenging receiver receives an indication of wireless frequencies that are authorized for communication, and wireless frequencies that are not authorized, further wherein the signal from the power-scavenging receiver does not cause a change in operational state for components of the apparatus other than the wireless transceiver, the environment defined by a plurality of readers to communicate with the power-scavenging receiver.

12. The apparatus of claim 11 wherein the power-scavenging receiver comprises a radio frequency identification (RFID) receiver.

13. The apparatus of claim 11 further comprising:
a memory coupled with the power-scavenging receiver; and
a power-scavenging transmitter coupled with the memory to transmit a value received from the memory in response to the signal received by the power-scavenging receiver.

\* \* \* \* \*